United States Patent Office 3,030,182
Patented Apr. 17, 1962

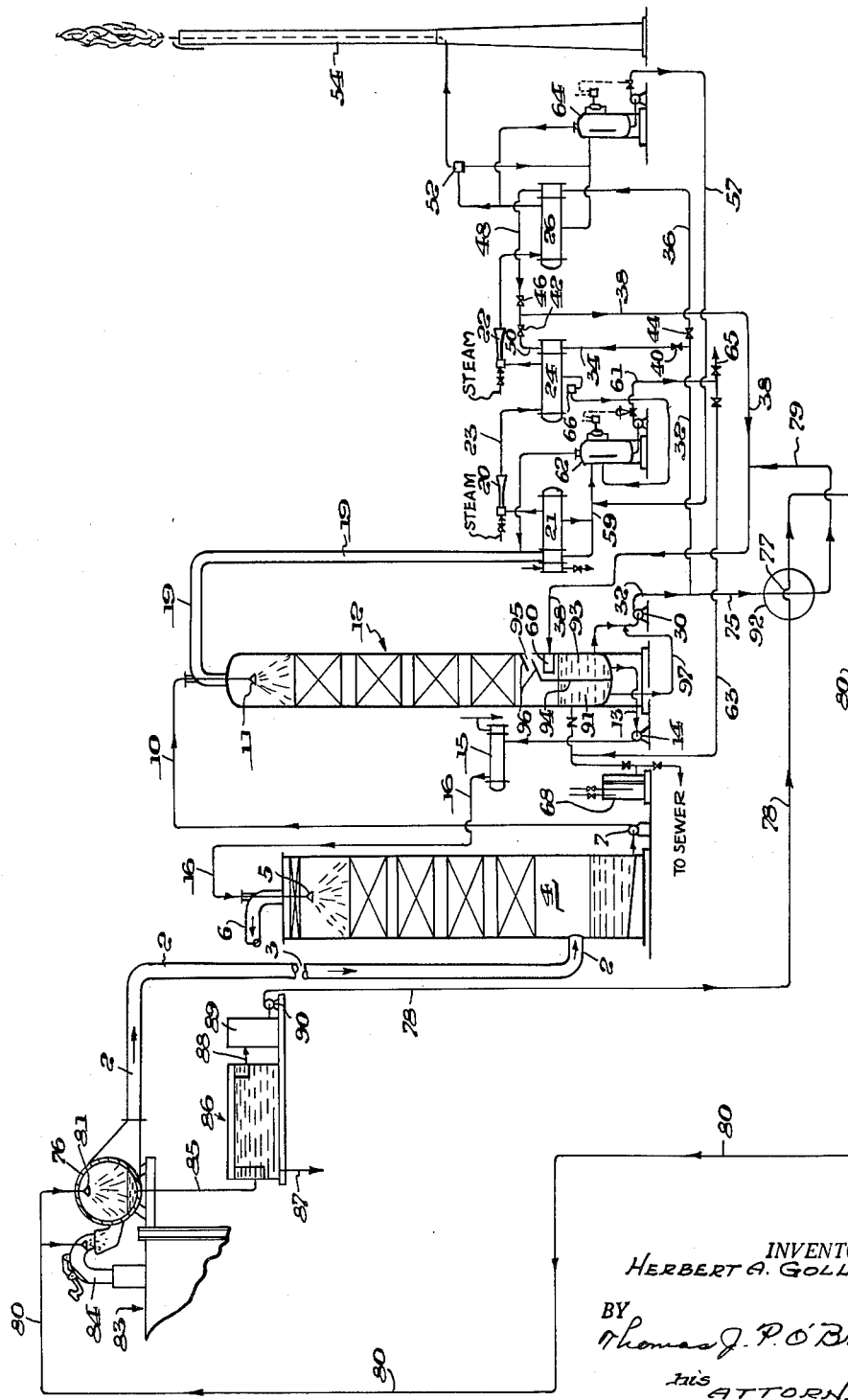

3,030,182
SEPARATION AND RECOVERY OF H₂S
Herbert A. Gollmar, Bethel Park, Pa., assignor to Koppers Company, Inc., a corporation of Delaware
Filed Dec. 17, 1959, Ser. No. 860,215
2 Claims. (Cl. 23—181)

The present invention relates to improvements in the gas purification process as described in detail in Sperr Patent No. 1,533,773, issued April 14, 1925, for separation of acid gases, such as hydrogen sulphide, hydrogen cyanide, and carbon dioxide, from gases containing them, for example, coal carbonization gases, and more particularly, to improvements in the absorption phase of such processes, and more especially, to such process as improved in the manner described in my Patents Nos. 2,379,076, issued June 26, 1945, and 2,464,805, issued March 22, 1949, wherein the waste heat of coke oven gas, and more particularly, the waste heat of the flushing liquor from the collecting mains of coke ovens, is utilized as the source of heat for effecting the actification of the fouled liquor from the absorption step of the liquid purification of gas processes described in said Sperr patent.

The primary object of the invention is to modify the process steps, and more particularly, those of the actification phase, in a manner to carry out the vaporization of the absorbed impurities with a diversion of the solution that descends from the actifier column so that it all enters a boiling zone to generate vapors and is flash evaporated to release residual hydrogen sulphide before it returns to the absorption phase, thereby reducing still further the concentration of H₂S in the actified solution that is returned to the absorption phase. With this decreased content of H₂S in the actified solution that is recycled to absorb H₂S from gas, the gas is purified to a still higher degree than has been possible heretofore with these processes, a further reduction in the H₂S content of the purified gas to the extent of about 10 grains per 100 cubic feet is attained.

More specifically, the object of the invention is to modify the actification steps of such patent processes in a manner such as to reduce the amount of hydrogen sulphide in the actified solution that is carried over into the absorption phase as a result of the heat recovered from the heating medium that heated the absorbent solution, and more particularly, the waste heat of the flushing liquor from the coke oven collecting means, and the steam actifier vapor mixture from the jet evacuating means of my Patent No. 2,842,423, issued July 8, 1958, by making more efficient use of the flash solution residual to flashing off of the vapors generated by such heat to regenerate the solution, so that a most highly purified gas is obtained from the absorption phase of these processes.

The present invention retains the advantages of low thermal cost of operation of said patented process while attaining a substantial increase in the purity of the gas treated by the process, by diverting the actified solution from the flash solution and withdrawing part of the flash solution to the gas treatment part of the process before the flash solution is mixed with actified solution to be then boiled and flash evaporated into the actifier phase of the process.

In the process of said patents, the gas is scrubbed with actified alkaline solution in cyclic flow between an absorption phase and an actification phase. In the latter, the fouled solution from the absorption phase is first stripped or scrubbed with vapors generated from a larger volume of the solution circulating between the actifier and a heat exchanger than the volume of solution that is returned to the absorber for purification of the gas.

Upon return to the actifier from the heat exchanger, the solution is flash evaporated, releasing steam and hydrogen sulphide from the flash solution to the actifier, to strip the fouled solution. The flash solution then mixes with the descending actified absorber solution and a smaller part is then returned to the absorber and the larger part returned to the heat exchanger.

I have found that the flash solution that mixes with the actified solution, has an equilibrium that is about 10 grains per 100 cubic feet of gas to be purified, lower than the solution that is returned to the absorber. The flash solution being larger in volume, and with the vapor pressure of hydrogen sulphide above the flash solution lower than H₂S equilibrium pressure of the more foul actified absorber solution mixing with the flash solution, the mixture from which the part is returned to the absorber, has a higher equilibrium of more grains H₂S per gallon, than that of the flash solution.

The present invention, therefore, aims to modify said process to the advantage of attaining a higher degree of purifying gas in the absorption stage by utilizing part of this flash solution as the part for absorption of H₂S from gas, before it mixes with the more foul actified solution for cyclic flow to the heat exchanger and back for the flashing evaporation in said process.

Briefly stated, this is attained by flowing fouled absorbent from the hydrogen sulphide absorption zone through an actification zone under less than atmospheric pressure and actifying it therein by countercurrent direct contact with vapors generated from the absorbent to strip the absorbed hydrogen sulphide therefrom; collecting the actified absorbent and flowing it into indirect contact with a heating medium to heat the absorbent to a temperature at which it vaporizes under the reduced pressure of said actification; flash evaporating the so-heated absorbent with passage of the vapors into countercurrent contact as aforesaid with the fouled absorbent in the actification zone to strip the hydrogen sulphide therefrom; mixing the actified flash solution with the collected actified absorbent from the actification zone that is to flow into heat exchange with the heating medium as aforesaid; withdrawing, and returning to the absorption zone for removal of further hydrogen sulphide from gas therein, part of the actified solution from the flash solution before the flash solution is mixed as aforesaid with the collected actified absorbent from the actification zone for flow into heat exchange relation with the heating medium as aforesaid, and effecting the aforesaid absorption of hydrogen sulphide from the gas in the absorption zone with said withdrawal part of the flash solution.

Preferably, this is attained by collecting the actified solution at the base of a descending column of the solution in the actification zone, flashing the solution as aforesaid at the base of said descending column of solution in the path of the descending solution, thereafter mixing the descending solution and flash solution for said flow into heat exchange relation as aforesaid, and diverting the solution that descends in the actification zone from the flash solution so that it all enters into mixture with the flash solution and passes through the heat exchange step to vaporize it and is flash evaporated as aforesaid before it is withdrawn as the part for return to the absorption zone.

Preferably, the heating medium for boiling the solution in the heat exchanger section of the process, is the collecting main flushing liquor of coke oven plants, as described in my aforesaid Patent No. 2,464,805. However, the process of the invention is not limited in all its aspects to this use of that liquor as the heating medium, since the process of the present invention is also applicable to use of low-pressure steam as the heating medium, as described in my Patent No. 2,842,423, and also to use with hot coke oven gas as the heating medium, as described in my Patent No. 2,379,076.

The various features of the invention are shown in the accompanying drawing which is illustrative only.

The single FIGURE is a flow diagram of the hot actification gas purification process and apparatus, employing diverting compartments at the base of the actifier column with heating of the flash solution, to provide the stripper vapors, by means of heat recovered from the waste heat of coke oven gas and from the waste heat of the vacuum-producing means for the actifier.

The hot-vacuum-actification process of separating acid gases from, for example, coke oven gases, comprises broadly absorbing the acid gases such as $H_2S$, HCN and $CO_2$ in an alkali metal carbonate solution in a scrubber, then heating the alkaline solution under a high vacuum in an actifier to drive the acid gases out of the absorption solution. At the same time, the absorption solution is regenerated so that the solution may be returned to the scrubber in a closed cycle.

An alkaline metal carbonate solution generally is employed to absorb the acid gases from the gas, and when the fouled solution is heated under a vacuum to remove the acid gases, a very large quantity of water vapor is formed so that it is necessary to separate the water vapor from the acid gas before the acid gases can be further separated and refined. Since an alkaline metal carbonate solution normally is employed to absorb the acid gases from the fuel gas, the process has become known as the "vacuum carbonate process."

Referring to the FIGURE of the drawing, coke-oven gas containing hydrogen sulphide, flows through a pipe 2 into an absorber 4, in which the said gas rises in countercurrent contact with continuously descending absorbent, for example, an alkaline aqueous solution containing sodium carbonate and sodium acid carbonate.

The said sodium carbonate solution in the absorber 4, absorbs hydrogen sulphide and the other weakly acidic gases from the countercurrently flowing coke-oven gas. The so-treated coke-oven gas leaves the absorber at the top thereof and flows to additional apparatus of the by-product system through the pipe 6. Fouled absorbent solution is withdrawn from the bottom of the absorber 4 by a pump 7, which delivers it through pipe 10 into distributor 11 located in the top of the actifier tower 12.

In the actifying tower 12, the fouled liquor is heated, in accordance with the invention, under a high vacuum of approximately 4 inches of mercury absolute pressure to drive off the constituents absorbed in the alkaline liquor in the scrubber 4. The alkaline liquor flows downwardly through the actifier 12 and is met with water vapors generated from the alkaline solution by heat applied to the solution, as will be subsequently described. Revivified alkaline solution accumulates in the bottom of the actifier and a smaller portion thereof is drawn off through a line 13 to a pump 14 and is then returned, after being cooled in cooler 15, through a line 16 into distributor 5 in scrubber 4. Thus, alkaline absorption solution is circulated in a closed cycle between the scrubber 4 and the actifier 12 in which the absorption solution is revivified.

In accordance with the process of my Patent No. 2,842,423, steam jet evacuating means 20, 22, are provided to operate on vapors leaving the actifier, thereby overcoming difficulties, due to hard polymer formation. In this instance, the required substantial vacuum is maintained in the actifier 12 and condenser 21 by the use of steam jet evacuators 20, 22, in one or more stages, depending upon the pressure ratio in each stage, adapted for heat recovery. Normally, to reduce the pressure from atmospheric to 4 inches mercury absolute, two stages comprising jet evacuators 20 and 22 and condensers 24 and 26, are employed. Actifier vapors from vapor condenser 21 are mixed with operating steam in jet evacuator 20 while actifier vapors from inter-condenser 24 are mixed with operating steam in jet evacuator 22.

Part of the heat used in liberating hydrogen sulphide from the absorbent is derived by recovery of waste heat from the steam-actifier vapor mixture leaving the jet evacuator means. As shown in the drawing, steam-actifier vapors from jet evacuator 20, are withdrawn to inter-condenser 24, while steam-actifier vapors from jet evacuator 22 are withdrawn to after-condenser 26 to supply the heat to produce water vapor in the actifier as hereinafter described.

Another larger portion of the actified solution, than the portion withdrawn through line 13, is withdrawn from the base of actifier 12 by means of pump 30, and one part thereof is passed in indirect heat-exchange with the steam-actifier vapor mixture in the inter-condenser 24 and in the after-condenser 26, in parallel flow, the actified solution being conducted through lines 32 and 34 to inter-condenser 24, and through lines 32 and 36 to after-condenser 26. In condensers 24 and 26, the steam-actifier vapors are passed into indirect contact with fouled solution, heating the fouled solution to generate steam. This heated fluid is returned to actifier 12 through lines 50, 48, and 38, the generated steam passing into direct contact with sprayed fouled solution from nozzles 11 in the upper actification zone, as a result of flash evaporation in trough 60, liberating gases including hydrogen sulphide from the flash solution. Valves 40 and 42, as well as 44 and 46, are adjusted to control the rate of flow of actifier solution through exchanger-condensers 24 and 26 for maximum rise in temperature of the absorbent.

One jet evacuating means can be used. Nevertheless, it will be more desirable to employ a plurality of jet evacuating means. It will be necessary to admit sufficient steam through at least one jet evacuating means and provide a pressure ratio sufficiently high that the resulting steam actifier vapors will supply sufficient heat to the fouled solution to generate part of the steam necessary for hydrogen sulphide stripping. According to one desirable method, the first jet evacuator will be larger than the second jet evacuator. By this method, the vapors entering the second jet evacuator from a larger first evacuator will be at a higher temperature than those from vapor condenser 21, and if desired, valves 44 and 46 can be controlled so the temperatures in lines 50 and 48, will be equal.

Another part of the larger portion of the actified solution withdrawn from the actifier by the line 32, is brought by line 75 into indirect contact in boiling chamber 92 with hot flushing liquor from a coke oven collecting main 76 which passes through a nest of submerged tubes 77. The heat of the flushing liquor, which enters the tubes 77 at about 163°–165° C. through line 78, boils this part of the solution in which they are immersed under vacuum. From the boiling tubes 77, this part of the actified absorbent is withdrawn through line 79 and rejoins the solution in line 38 to return to the flash trough 60.

Cooled flushing liquor is flowed from the tubes 77 at a temperature of 116° F.–118° F. through a pipe 80 to the nozzle 81 of the collecting main 76.

The flushing liquor so delivered to the collecting main 76 is thus cooler than in customary operation; and as a result thereof, a thinner tar is condensed in the main, making the cleaning of the main easier, and the gas is cooled to a greater degree than that obtained by customary operation, thereby relieving the load on the primary gas-coolers at 3 (not shown) of a by-product plant.

Coke oven gas flowing from a coke oven battery 83 into the many stand-pipes 84, and thence, into the collecting main 76, is cooled therein to 163°–165° F. by a spray of flushing liquor at 116° F.–118° F. from nozzles 81. The flushing liquor having been heated to 163° F.–

165° F. by the hot gas in the collecting main 76, flows through a pipe 85 to a hot settling tank 86 in which tar which has been condensed therewith, is settled out and from which the tar is drained through a pipe 87. Flushing liquor is decanted from the hot settling tank 86 through a pipe 88 into hot flushing liquor pumping tank 89. The flushing liquor is pumped by a pump 90 from the tank 89 through pipe 78 back into the tubes 77 located in the boiling chamber 92 containing the tubes 77.

In the boiling chamber 92, the fouled liquor is heated under the high vacuum of the jet evacuating means 20, 22, above described, through line 38.

In order to prevent flashing of the 152° F. solution in lines 38, 75, 50, and 48, a trough 60 is provided within actifier 12 extending above the liquid level in the actifier. The trough extends the length of the diameter of the actifier column and is deep enough to provide a head pressure sufficient to keep the actifier solution in line 38 in the liquid state until it is returned to the trough 60. Thus, the 152° F. actifier solution is returned to the base of the trough in the liquid state because of the pressure due to the height of solution in the trough. As the solution rises in the trough 60, and the pressure decreases, the hot solution flashes under the vacuum in the actifier 12. Inasmuch as both fixed gases and vapor are rising in the column 12, and since the temperature of the fouled absorbent entering the top of the column 12 is 80° F., reflux reduces the load on vapor condenser 21.

Means 62 and 64 are provided for recovering condensate from condensers 21, 24, and 26. Since condensate enters tank 62 from both vapor condenser 21 and inter-condenser 24, low pressure steam trap 66 is provided, because vapor condenser 21 is under 3 inches mercury pressure, while inter-condenser 24 is under about 15 inches mercury pressure. From vessel 62, condensate is withdrawn through line 61, and through line 63 is recirculated through a check valve into the line to actifier 12, or if HCN content is low, the condensate can be discarded through line 65 and condensate from vessel 64 desirably can be recirculated to vessel 62 through lines 57 and 59, part being removed from the system through line 61, 65, and part being recirculated through lines 61 and 63 to the actifier 12, excess condensate being discharged to a sewer, as indicated on the drawing.

When necessary, fresh alkaline aqueous absorbing solution is added at 68, and in addition, overflow means (not shown) are provided to maintain a fixed liquid level in absorber 4.

The process may be modified, depending upon the incoming temperature of the coke oven gas, which is from 68° F. to 140° F. A supplementary indirect steam heat-exchanger (not shown) can be disposed in the actifier solution at the bottom of the actifier 12.

In operation with one instance of customary modern practice, coke oven gas enters line 2 at about 80° F. and is countercurrently contacted in absorber 4 by actified absorbent from the bottom of actifier 12. Since it is desired to have the temperature of the scrubbing solution approximately equal to that of the incoming gas, that is, about 80° F., solution cooler 15 is provided to cool the actified absorbent which is at a temperature of 127° F. at 4.2 inches Hg absolute in the bottom of actifier 12.

Fouled absorbent from absorber 4 is conducted to the top of actifier 12 through line 10 by pump 7. The actifier is maintained under a vacuum of 4.2 inches Hg absolute by the steam jet evacuators 20 and 22. Vapors from actifier 12 leave the top of the actifier through line 19 and pass to a vapor condenser 21 at a temperature of 120° F. and 3.5 inches Hg absolute. This vapor condenser is inserted between the first stage jet evacuator 20 and the actifier 12 because the actifier overhead contains large quantities of water vapor, for example, 10 mols of vapor to 1 mol of fixed gases. If this water vapor is not first condensed, say to 1 mol vapor to 1 mol of fixed gases, in vapor condenser 21, the amount of steam required in first stage jet evacuator 20, would be greater than that needed in heating the actifier solution. In vapor condenser 21, the overhead gases are cooled from 120° F. at 3.5 inches Hg absolute to 100° F. at 3.0 inches Hg absolute.

Steam is injected into the first stage jet evacuator 20 at about 150 lbs. gauge and the steam-actifier vapor mixture leaving the jet in line 23 enters inter-condenser 24 at 175° F. and 15.0 inches Hg absolute. It is seen that the pressure increase across the first stage jet evacuator is from 3 inches Hg to 15 inches Hg. In inter-condenser 24, the steam-actifier vapor mixture is cooled from 175° F. at 15.0 inches Hg to 155° F. at 14.8 inches Hg.

From inter-condenser 24, vapors pass to second stage jet evacuator 22 at a temperature of 155° F. at 14.8 inches Hg absolute. The temperature of the steam-actifier vapor mixture flowing from second stage jet evacuator 22 to after-condenser 26, is 216° F. at 34 inches Hg absolute. In after-condenser 26 the steam-actifier vapor mixture is cooled from 216° F. at 34 inches Hg to 160° F. at 33.5 inches Hg. The $H_2S$—HCN mixture is then passed from after-condenser 26 through a moisture eliminator 52 to recovery means such as a sulfuric acid plant or a flare stack 54.

As previously set forth, the hydrogen sulphide-containing gas is liberated from part of the fouled absorbent in the actification zone by application thereto of heat of the steam-actifier vapor mixture. Thus, the temperature of the actified absorbent in the bottom of actifier 12, is 127° F., while the temperature of inter-condenser 24 is 175° F., and in the after-condenser 26, is 210° F. To supply this part of the heat required in the actifier 12, actifier bottoms at 127° F. are withdrawn through line 32. A part of the actifier solution, through line 40, is passed in indirect heating exchange with steam-actifier vapors in inter-condenser 24, while another part is passed through line 36 in indirect heat-exchange with steam-actifier vapors in after-condenser 26. Both parts are heated from 127° F. to 152° F. and at this temperature are returned to the actifier trough 60 through line 38.

The herein described process can be employed to improve the efficiency of any process for liquid purification, wherein the fouled liquid absorbent containing a constituent which has been scrubbed from a gas or extracted from a liquid, is actifiable under sub-atmospheric pressure by heating. An example of a liquid purification process similar to the one described, comprises the use of water to absorb ammonia and hydrogen cyanide from raw coke oven gas, the water containing the absorbed gases being thereafter actifiable by heating at sub-atmospheric pressure. Aqueous absorbents can be, for example, water or aqueous solutions of potassium, sodium, or other alkali metal carbonates and bicarbonates, solutions of alkali metal salts of other weak acids, or solutions of weak bases, such as organic amines. The absorbable constituent in coke oven gas, or coal gas, can be hydrogen sulphide, hydrogen cyanide, carbon dioxide, ammonia, light oil or carbon disulfide. Thus, petroleum distillates, or light oil from coke oven effluent or other sources, can be purified in respect of removal of its hydrogen sulphide content by extraction of it with an alkaline aqueous solution which can thereafter be regenerated under vacuum by the low-temperature heat.

In general, with the customary operation of said process as heretofore applied, as above-described, the flashed solution that overflows the trough 60 in the boiling section 91 at the base of the actifier 12, has an equilibrium that is about 10 grains per 100 cubic feet of gas lower than the solution that is pumped through lines 13 and 16 to the nozzles 5 of the $H_2S$ absorber 4.

The volume of flash solution that circulates through trough 60 is about five times as great as the volume of solution that flows down the actifier column 12 and drains into the boiling section 91. The solution that drains down in the column 12 is a more foul solution. These two solutions heretofore mixed in the boiling section 91 to form the "actified" solution, part of which is pumped through line 13, 16 to the H₂S absorber 4. Based on typical flow rates, the following facts will be found:

(a) The solution that drains from the actifier column into the boiling section 91, contains 197 grains H₂S per gallon and has an equilibrium of about 85 grains.

(b) The flashed solution that overflows from the trough 60 contains 105 grains per gallon and has an equilibrium of 29 grains.

(c) The mixture in the boiling section 91, which is one part of (a) plus three parts of (b), contains 128 grains per gallon and has an equilibrium of 40 grains.

The mixture (c) is the solution that is pumped from the base of the actifier, one stream through line 13 to the absorber 4, and one stream through line 38 to the flash solution heat exchangers 24, 26.

The H₂S content in the vapors that ordinarily leave the boiling section 91, is midway between the equilibriums of the solution that enters the flash trough 60 and the solution that ordinarily leaves through lines 13 and 32. This H₂S content is about 86% of the equilibrium of the actified solution.

In accordance with the present improvement, the base 91 of the actifier 12, is changed to take advantage of the above situation, by diverting the actified solution from the column 12 so that all of the solution that flows down the actifier 12 from the nozzles 11 will enter the flash solution pump 30 and be flashed in trough 60 before it is withdrawn from the base of the actifier 12, for return to the absorber through lines 13 and 16.

By placing the baffle 94 in the boiling section 91 in the manner hereinafter-described, the solution that descends from the actifier column 12 must all pass through the heat-exchangers 92, 24, and 26, and be flashed in the flash trough 60, before it enters the pipe 13 and is pumped to the absorber. Were the baffle 94 not included in the process, the equilibrium of the solution that enters line 13 would be 10 grains H₂S per 100 cubic feet higher than it is when the baffle 94 is used.

With this change, the gas in the absorber 4 is thereby purified then as heretofore, but so as to reduce the H₂S content of the purified gas to the extent of about 10 grains per 100 cubic feet of gas.

The volume of the solution circulating from the base of the actifier 12 through line 32 to the heat exchangers 92, 24, 26, and back through line 38 to the trough 60, is generally five times the volume returned to the absorber 4 by line 13.

Accordingly, with the present invention, the base 91 of the actifier 12, is divided into two compartments, 91 and 93, by a diverting partition 94 which diverts all of the descending actified solution from the upper part of the actifier 12 to the compartment 91, so that all of it collects there and does not mix with flash solution in compartment 93. The trough 60 is located within this compartment 93 and flash solution which overflows the trough is then uncontaminated by solution that descends in the actifier 12. The vapors and acidic gases released by flash evaporation in trough 60 pass upwardly into countercurrent contact as usual with the descending solution from the nozzles 11, the vapors and gas passing through the communication 95 in the deflector top 96 of the partition 94. The line 13 leading to the actified solution pump 14, for passing the actified solution to line 16 to enter the nozzles 5 of the absorber 4, is connected only to the flash solution compartment 93, so that all actified solution that is passed to the absorber 4 is a part of the flash solution that is withdrawn before it mixes with the actified solution returned to the actifier 12 from the absorber 4. The remaining part of the flash solution from flash solution compartment 93, leaves the same through line 32 to enter the flash solution pump 30. The actified solution as it is collected in the actified solution compartment 91, is led off therefrom by line 97 to enter line 32 to mix with flash solution as it enters the flash solution pump 30. In operation, say 75 gallons of flash solution is circulated through pump 30 to the heat exchangers 92, 24 and 26 and back to the trough 60, and 15 gallons, per million cubic feet of gas being treated in absorber 4, is circulated from the actifier 12 to the nozzles 5 of the absorber 4, and back again to the actifier nozzles 11. In such case, 75 gallons (per M c.f. gas) enter compartment 93 through line 38 and trough 60. Then 60 gallons leave said trough to enter flash solution pump 30, and 15 gallons from the actified solution compartment 91 enter the flash solution pump 30 through line 97, thus remaking the 75 gallons (M c.f. of gas) to return to the trough. The 15 gallons per M c.f. of gas flow from the flash solution compartment 93 through line 13 to the actified solution pump 14 and absorber 4, which gallonage later re-enter the actified solution compartment 91 to mix with flash solution in pump 30.

The invention is not limited in all its aspects to the novel steps of the process being carried out in the base of the absorber, since much of the advantage of the improvement may be attained in other ways, as by having the actified solution from the actifier led off merely by a pipe to the pump 30, or the flash solution compartment may well be a compartment outside the actifier tower 12 with a vapor line therefrom into the actifier tower 12.

The invention as hereinabove set forth is embodied in a particular form and manner, but may be variously embodied within the scope of the hereinafter made claims.

What is claimed is:

1. A process for separation and recovery of hydrogen sulphide from coal carbonization gas, which comprises: scrubbing coal carbonization gas in an absorption zone with an actified alkaline aqueous absorbent solution to remove hydrogen sulphide from the gas, flowing fouled absorbent from the absorption zone through an actification zone under less than atmospheric pressure and actifying it therein by countercurrent direct contact with vapors generated from the absorbent to strip the absorbed hydrogen sulphide therefrom; injecting steam through jet evacuating means in communication with the fouled solution in the actification zone during its actification as aforesaid to maintain said subatmospheric pressure therein and producing within said jet evacuating means a mixture of steam and actifier vapors and thereby removing the liberated hydrogen sulphide from said actification zone; collecting the actified absorbent solution in a pool at the base of the actification zone and flowing it out of the pool with passage of one part of it into indirect contact with hot flushing liquor effluent of the collecting main of a coke oven battery at a zone beyond the pool, and with passage of another part of it in indirect heat exchange relation with the steam actifier vapor mixture aforesaid at a zone beyond the pool to heat the absorbent of both parts to a temperature at which it vaporizes under the reduced pressure of said actification; returning the heated absorbent back into the base of the actification zone; flash evaporating the so-heated parts of the absorbent with passage of the vapors of the flash solution into countercurrent contact as aforesaid with the fouled absorbent in the actification zone above the pool to strip the hydrogen sulphide therefrom, mixing only part of the collected condensate of the flash solution vapors with all of the collected actified absorbent from the actification zone for flow into heat exchange as aforesaid with the flushing liquor effluent of a coke oven battery and with the steam actifier vapor mixture aforesaid; withdrawing, and returning to the absorption zone for removal of further hydrogen sulphide from gas therein, the residual cleaner liquid part of the flash solution from the base of the actification zone devoid of mixture as aforesaid with the collected actified absorbent from the actification zone that is to flow into heat exchange relation as aforesaid with the hot flushing liquor effluent and the steam actifier vapor mixture aforesaid, and effecting the aforesaid absorption of hydrogen sulphide from the gas in the absorption zone with said withdrawn residual cleaner liquid part of the flash solution.

2. In a process for removing hydrogen sulfide from a gas by scrubbing the gas in an absorption zone with actified alkaline aqueous absorbent solution, whereby the absorbent solution becomes fouled with the hydrogen sulfide so removed, flowing the fouled absorbent solution through an actification zone countercurrent to steam vapors to strip the absorbed hydrogen sulfide from the solution, collecting the actified absorbent solution in a pool at the base of the actification zone, flowing the actified absorbent solution from the pool through a heat exchanger to heat the absorbent to a temperature at which it will vaporize, and returning the heated absorbent back to the base of the actification zone whereupon a portion of the heated absorbent will flash to provide said steam vapors for the actification and a portion will remain as residual liquor, the improvement which comprises separating said residual liquor from the pool of actified absorbent solution, flowing part of said residual liquor to said absorption zone for contact with said gas, and flowing the remainder of said liquor to said heat exchanger to mix with said actified absorbent.

References Cited in the file of this patent

UNITED STATES PATENTS

| | | |
|---|---|---|
| 2,379,076 | Gollmar | June 26, 1945 |
| 2,464,805 | Gollmar | Mar. 22, 1949 |
| 2,842,423 | Gollmar | July 8, 1958 |
| 2,886,405 | Benson et al. | May 12, 1959 |